United States Patent
Fujio et al.

(10) Patent No.: US 10,242,475 B2
(45) Date of Patent: Mar. 26, 2019

(54) DRIVING SUPPORT DEVICE AND DRIVING SUPPORT METHOD

(71) Applicant: FUJITSU TEN LIMITED, Kobe-shi, Hyogo (JP)

(72) Inventors: Akihide Fujio, Kobe (JP); Hiroki Murasumi, Kobe (JP); Yuuki Matsumoto, Kobe (JP); Shigeto Takeuchi, Kobe (JP)

(73) Assignee: FUJITSU TEN Limited, Kobe-shi (JP)

( * ) Notice: Subject to any disclaimer, the term of this patent is extended or adjusted under 35 U.S.C. 154(b) by 0 days.

(21) Appl. No.: 15/160,222

(22) Filed: May 20, 2016

(65) Prior Publication Data
US 2016/0358358 A1    Dec. 8, 2016

(30) Foreign Application Priority Data

Jun. 5, 2015  (JP) ................. 2015-115110

(51) Int. Cl.
| | |
|---|---|
| *G06T 11/60* | (2006.01) |
| *H04N 7/18* | (2006.01) |
| *B60R 1/00* | (2006.01) |
| *G06T 11/00* | (2006.01) |

(52) U.S. Cl.
CPC ............. *G06T 11/60* (2013.01); *B60R 1/00* (2013.01); *G06T 11/00* (2013.01); *B60R 2300/806* (2013.01)

(58) Field of Classification Search
CPC ............ G06T 11/60; G06T 11/00; B60R 1/00
See application file for complete search history.

(56) References Cited

U.S. PATENT DOCUMENTS

| | | | | |
|---|---|---|---|---|
| 6,488,109 | B1* | 12/2002 | Igaki | B60T 8/17557 180/169 |
| 8,665,116 | B2* | 3/2014 | Ghneim | B62D 15/0275 340/441 |
| 2007/0146166 | A1* | 6/2007 | Sato | B62D 15/028 340/932.2 |
| 2009/0015675 | A1* | 1/2009 | Yang | B60R 1/00 348/148 |
| 2015/0331238 | A1* | 11/2015 | Roth | B60K 37/00 348/115 |

FOREIGN PATENT DOCUMENTS

| | | |
|---|---|---|
| JP | 2007-176324 A | 7/2007 |
| JP | 2009-017462 A | 1/2009 |
| JP | 2012-216997 A | 11/2012 |

* cited by examiner

*Primary Examiner* — Samantha (Yuehan) Wang
(74) *Attorney, Agent, or Firm* — Oliff PLC (57) ABSTRACT

A driving support device according to an embodiment includes an estimation unit, a rendering unit, and an erasing unit. The estimation unit estimates a running state of a movable body based on an image taken on the movable body. The rendering unit produces a prediction line that indicates a predicted direction of travel of the movable body based on the running state estimated by the estimation unit, and superimposes and renders the prediction line on the taken image. The erasing unit erases the prediction line rendered by the rendering unit in a case where the estimation unit estimates that the movable body is stopped.

7 Claims, 11 Drawing Sheets

DRIVING SUPPORT DEVICE AND DRIVING SUPPORT METHOD

CROSS-REFERENCE TO RELATED APPLICATION

This application is based upon and claims the benefit of priority of the prior Japanese Patent Application No. 2015-115110, filed on Jun. 5, 2015, the entire contents of which are incorporated herein by reference.

FIELD

The embodiment discussed herein is directed to a driving support device and a driving support method.

BACKGROUND

Conventionally, for example, a technique of displaying, for a driver, a camera image of a situation behind a vehicle that is taken by an on-vehicle camera during backward running of the vehicle has been proposed as a technique for supporting a driver.

A driving support method is provided that uses such a technique to render a prediction line that indicates a predicted direction of travel of a vehicle, based on a plurality of camera images arranged in a time series, and superimpose and display the prediction line on the camera images (see, for example, Japanese Laid-open Patent Publication No. 2009-017462).

However, in the conventional technique described above, when the vehicle is stopped, a change between the camera images in a time series is not caused, and hence, the prediction line immediately before stopping is not updated and remains displayed. As a steering wheel is operated during stopping of the vehicle, an actual direction of travel thereof deviates from the prediction line that remains displayed. Thus, in the conventional technique, an accurate prediction line is not necessarily displayed and there is a possibility of causing a driver to misunderstand.

SUMMARY

A driving support device according to an embodiment includes an estimation unit, a rendering unit, and an erasing unit. The estimation unit estimates a running state of a movable body based on an image taken on the movable body. The rendering unit produces a prediction line that indicates a predicted direction of travel of the movable body based on the running state estimated by the estimation unit, and superimposes and renders the prediction line on the taken image. The erasing unit erases the prediction line rendered by the rendering unit in a case where the estimation unit estimates that the movable body is stopped.

BRIEF DESCRIPTION OF DRAWINGS

More complete recognition of the present invention and advantage involved therewith could readily be understood by reading the following detailed description of the invention in conjunction with the accompanying drawings.

DESCRIPTION OF EMBODIMENTS

In the following, an embodiment of a driving support device and a driving support method that are disclosed in the present application will be described in detail with reference to the accompanying drawings. The present invention is not limited to an embodiment described below. Although a case where a movable body is a vehicle will be described in the following embodiment, such a movable body may be a train, a ship, or an airplane.

In the following, first, a configuration example of a vehicle that includes a driving support device according to the embodiment will be described by using FIG. 1, and subsequently, an outline of a driving support method according to the embodiment will be described by using FIG. 2. Then, a content of a process in the driving support device according to the embodiment will specifically be described by using FIG. 3 to FIG. 10. Variations of the embodiment will be illustrated in FIG. 8 to FIG. 10.

First, an outline of a driving support method according to the embodiment will be described by using FIG. 1 and FIG. 2. FIG. 1 is a diagram illustrating a configuration example of a vehicle 100 that includes a driving support device 10 with a driving support method applied thereto. FIG. 2 is a diagram illustrating an outline of a driving support method according to the embodiment.

Figure 1:
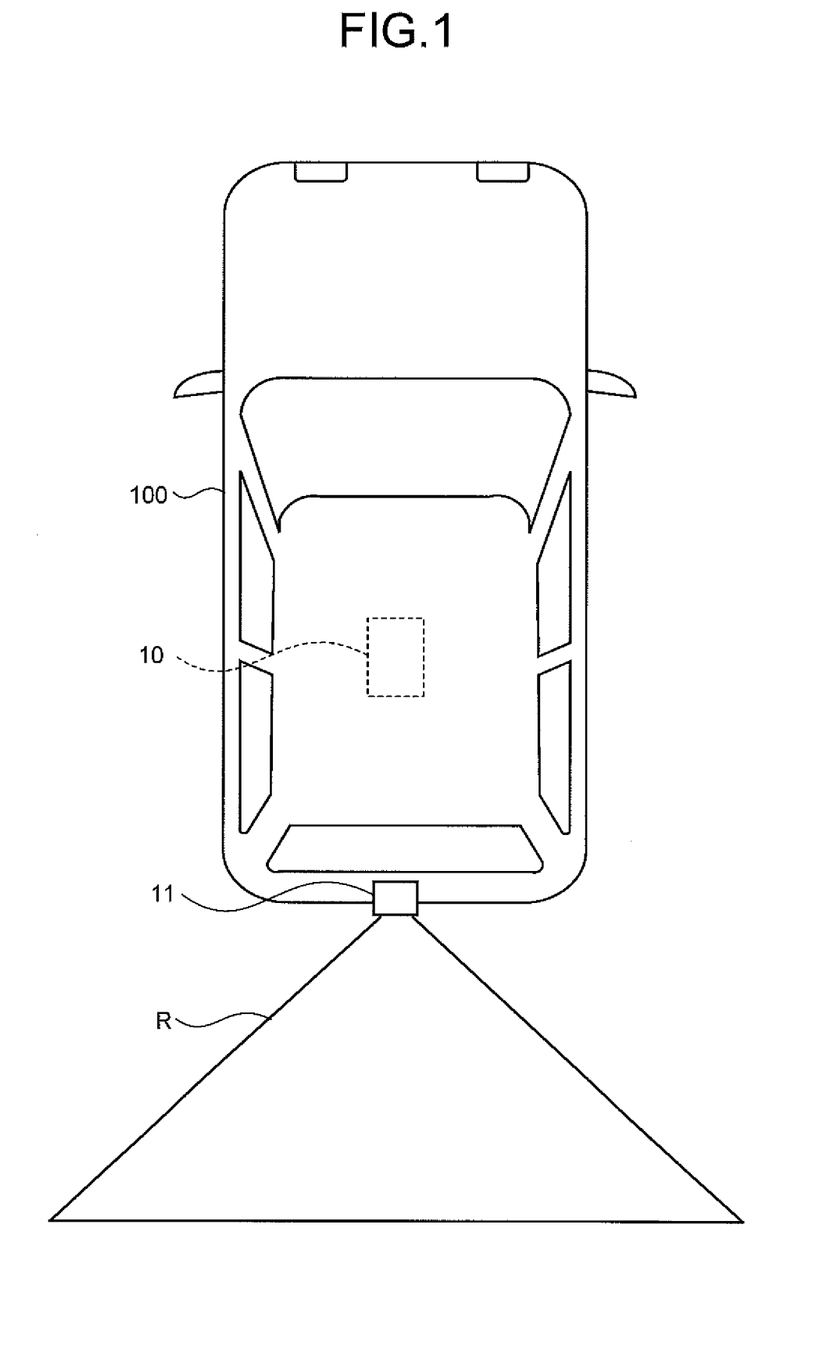
FIG. 1 is a diagram illustrating a configuration example of a vehicle that includes a driving support device according to an embodiment.

As illustrated in FIG. 1, the vehicle 100 includes the driving support device 10 and a camera 11. The driving support method according to the embodiment is executed by, for example, the driving support device 10.

The camera 11 is, for example, a back camera that is mounted on a rear of the vehicle 100 and takes an image of a region R. The camera 11 continuously takes images of the region R in a case where the vehicle 100 runs backward. A mounting position of the camera 11 is not limited to a rear of the vehicle 100 and the region R to be image-taken is also not limited to the region in the illustrated example.

The driving support device 10, for example, is installed inside the vehicle 100 and displays, for a driver, a superimposed image provided by superimposing an image produced by the driving support device 10 on a camera image taken by the camera 11, and thereby, support of driving is executed.

An outline of a driving support method to be executed by the driving support device 10 will be described with reference to FIG. 2. FIG. 2 is a diagram illustrating an outline of the driving support method. FIG. 2 illustrates time-series and continuous superimposed images 1a and 1b, where the superimposed image 1a is an image produced at a time before the superimposed image 1b in a time series.

A part of the vehicle 100 (a vehicle with the driving support device 10 mounted thereon), other vehicles 110, and a parking space 120 in the superimposed image 1a or 1b are camera images taken by the camera 11. On the other hand, prediction lines 2 and vehicle width lines 3 in the superimposed image 1a or 1b are images produced by the driving support device 10.

The prediction lines 2 are both edges of a predicted band-shaped trajectory of the vehicle 100 in a direction of travel thereof, that is, boundary lines of such a trajectory, and for example, are a pair of lines. The prediction lines 2 are indicated by a pair of lines, and are not limited thereto, and for example, an entirety of such a trajectory may be indicated by, coloring thereof.

The vehicle width lines 3 indicate a vehicle width of the vehicle 100 in a current orientation thereof and are displayed in a trapezoidal shape composed of an upper base and both edge lines. Although a case where the vehicle width lines 3 are displayed by broken lines is illustrated in FIG. 2, a display mode thereof is not limited thereto as long as it is possible to distinguish from the prediction lines 2. Although the vehicle width lines 3 in combination with the prediction lines 2 are displayed in FIG. 2, the vehicle width lines 3 may not be displayed.

For example, the vehicle width lines 3 are superimposed on a camera image by a process in the driving support device 10 similarly to the prediction lines 2, and descriptions of the vehicle width lines 3 may be omitted below to simplify the description.

In the present embodiment, a situation that the vehicle 100 runs backward and is parked in the parking space 120 with both sides interposed between the stopped vehicles 110 is assumed as one example. It is also possible to apply the driving support method according to the embodiment to a situation of forward running or turning of the vehicle 100.

Figure 2:
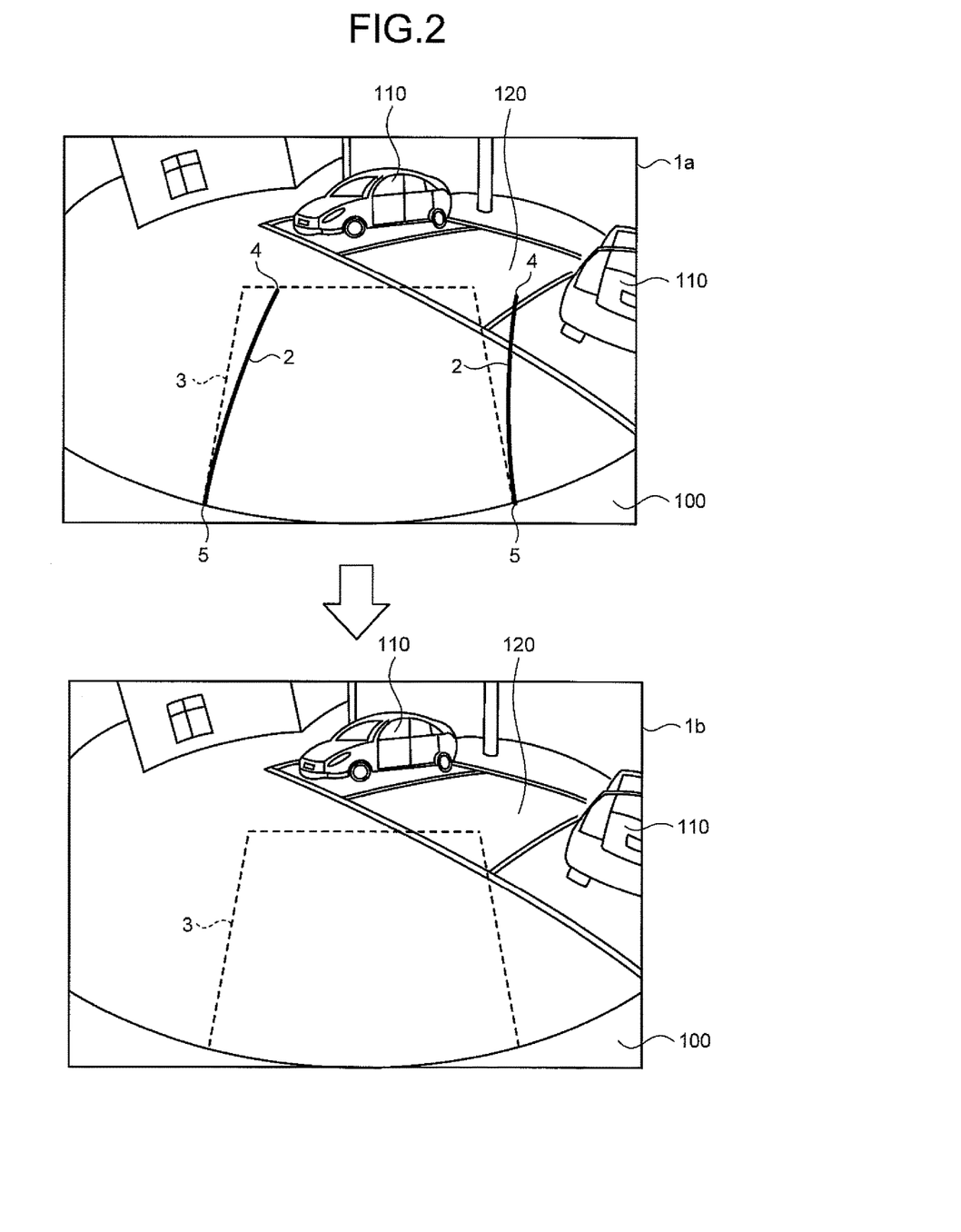
FIG. 2 is a diagram illustrating an outline of a driving support method according to an embodiment.

The superimposed images 1a and 1b illustrated in FIG. 2 are produced based on a camera image taken in such a situation. In a case of parking in the parking space 120, a driver of the vehicle 100 will drive carefully while attention is paid to the vehicles 110 at both sides thereof, in order to avoid contact with the vehicles 110.

For this reason, the driving support device 10 displays the prediction lines 2 as illustrated in the superimposed image 1a, and thereby, allows a driver to execute smooth driving.

Specifically, first, the driving support device 10 arranges in a time series and uses a plurality of camera images taken at different times by the camera 11. Subsequently, the driving support device 10 compares the camera images arranged in a time series to detect a difference produced by a change between the camera images.

Subsequently, the driving support device 10 predicts what direction of travel the vehicle 100 runs in, based on the detected difference, and thereby, estimates such a direction of travel thereof.

Subsequently, the driving support device 10 estimates a trajectory of the vehicle 100 in the predicted direction of travel based on the predicted direction of travel and a vehicle width of the vehicle 100. Then, the driving support device 10 renders the prediction lines 2 that are a pair of lines at both edge sides of such a trajectory (see an upper view in FIG. 2), and produces, and displays, for a driver, the superimposed image 1a with the prediction lines 2 superimposed on a camera image.

For example, the prediction lines 2 illustrated in FIG. 2 indicate, in the superimposed image 1a, curved lines that curve rightward from proximal ends 5 close to the vehicle 100 to distal ends 4 distant from the vehicle 100. Thereby, a driver can understand that the vehicle 100 travels rightward in a case of backward running, that is, travels toward the parking space 120.

In the superimposed image 1a, the distal ends 4 are ends at a greater distance from the vehicle 100 and the proximal ends 5 are ends at a less distance from the vehicle 100.

That is, an example of FIG. 2 indicates that the vehicle 100 gradually travels rightward. Distances between the distal ends 4 and the proximal ends 5, that is, lengths of the prediction lines 2, are not limited to examples of FIG. 2, and can be set at arbitrary lengths.

However, the prediction lines 2 are rendered based on a camera image, and hence, as the vehicle 100 is stopped, a change or difference between camera images in a time series is not produced. That is, new prediction lines are not rendered, and the prediction lines 2 rendered based on a camera image immediately before stopping are not updated but continue to be displayed for a driver.

For example, in a case where a driver operates a steering wheel during stopping of the vehicle 100, an actual steering angle of the vehicle 100 is changed, but the vehicle 100 is not moved, and hence, a taken camera image is not changed. That is, the prediction lines 2 are not updated, so that an actual direction of travel of the vehicle 100 deviates from a direction of travel indicated by the displayed prediction lines 2 immediately before stopping.

Hence, a driver may misunderstand the prediction lines 2 displayed in the superimposed image 1a as an actual direction of travel, and if the driver resumes backward running with such misunderstanding, the driver may be confused and not be able to execute smooth driving.

Hence, the driving support device 10 according to the embodiment erases the prediction lines 2 from the superimposed image 1a in a case where the vehicle 100 is stopped. Thus, the driving support device 10 displays the superimposed image 1b with the prediction lines 2 having been erased therein, and hence, can prevent a driver from readily misunderstanding.

Thereby, even when a driver operates a steering wheel during stopping of the vehicle 100, the driving support device 10 can avoid continuing to display, for the driver, the prediction lines 2 that indicate a direction of travel different from an actual direction of travel of the vehicle 100. That is, the driving support device 10 can prevent a driver from readily misunderstanding. Details of erasing of the prediction lines 2 to be executed by the driving support device 10 will be described below.

Figure 3:
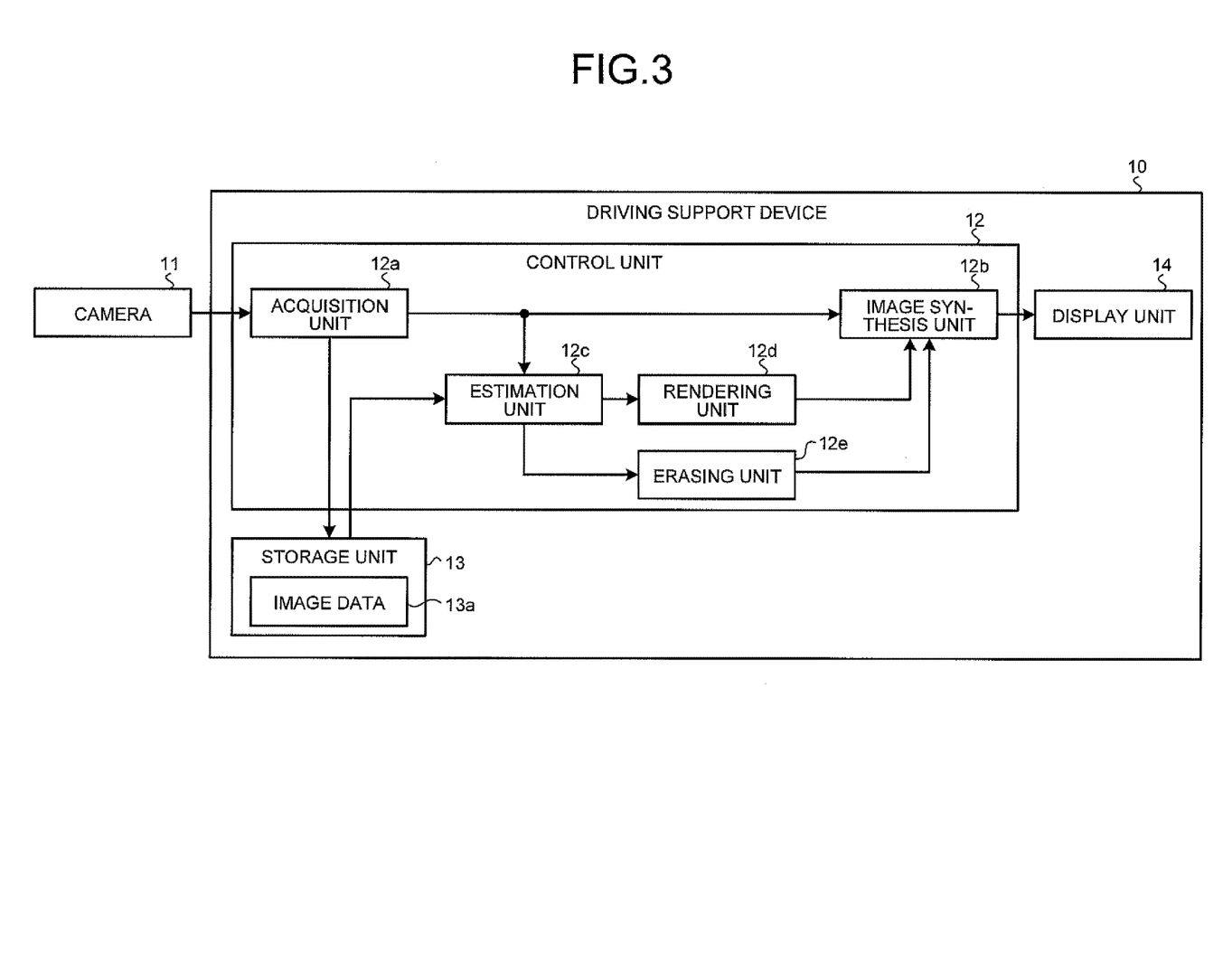
FIG. 3 is a block diagram illustrating a configuration of a driving support device according to an embodiment.

In the following, the driving support device and driving support method according to the embodiment will be described specifically. First, a configuration example of the driving support device 10 according to the embodiment will be described with reference to FIG. 3. FIG. 3 is a block diagram illustrating a configuration of the driving support device 10 according to the embodiment. It is possible to apply the driving support device 10 according to the embodiment to, for example, an on-vehicle system such as a car navigation system.

As illustrated in FIG. 3, the driving support device 10 includes a control unit 12, a storage unit 13, and a display unit 14. A camera 11 is connected to the driving support device 10.

Although the driving support device 10 in FIG. 3 is configured to include the display unit 14, the driving support device 10 may be configured, for example, not to include the display unit 14. Although the driving support device 10 in FIG. 3 is configured not to include the camera 11, the driving support device 10 may be configured to include the camera 11.

The control unit 12 includes an acquisition unit 12a, an image synthesis unit 12b, an estimation unit 12c, a rendering unit 12d, and an erasing unit 12e. An entirety or a part of the control unit 12 can be composed of, for example, hardware such as an Application Specific Integrated Circuit (ASIC) or a Field Programmable Gate Array (FPGA).

For the storage unit 13, for example, a semiconductor memory element such as a Random Access Memory (RAM) or a flash memory can be used, and the storage unit 13 is not limited thereto.

The storage unit 13 stores a camera image input from the camera 11 as image data 13a. The storage unit 13 arranges in a time series and stores the image data 13a associated with a time when an image is taken.

The acquisition unit 12a is, for example, an input port, and acquires a camera image taken by the camera 11. Image data that indicate a camera image acquired by the acquisition unit 12a are output to each of the storage unit 13, the image synthesis unit 12b, and the estimation unit 12c.

The estimation unit 12c estimates a running state of the vehicle 100 based on a camera image taken by the camera 11. Specifically, first, the estimation unit 12c acquires the image data 13a of a camera image taken immediately before a camera image taken at a current time among a plurality of the image data 13a stored in the storage unit 13.

Subsequently, the estimation unit 12c compares a camera image at a current time that is acquired from the camera 11 with a camera image taken immediately before the current time that is acquired from the storage unit 13, and detects a difference produced by a change between the camera images.

Subsequently, the estimation unit 12c estimates whether the vehicle 100 is running or stopped based on the detected difference. For example, in a case where it is estimated that the vehicle 100 is running, the estimation unit 12c estimates a running state of the vehicle 100 such as a steering angle or a running speed, based on a change or difference between camera images, and outputs, to the rendering unit 12d, running estimation data that indicate a result of estimation.

In a case where it is estimated that the vehicle 100 is stopped, the estimation unit 12c outputs, to the erasing unit 12e, stopping estimation data that indicate a result of estimation of stopping.

Figure 4A:
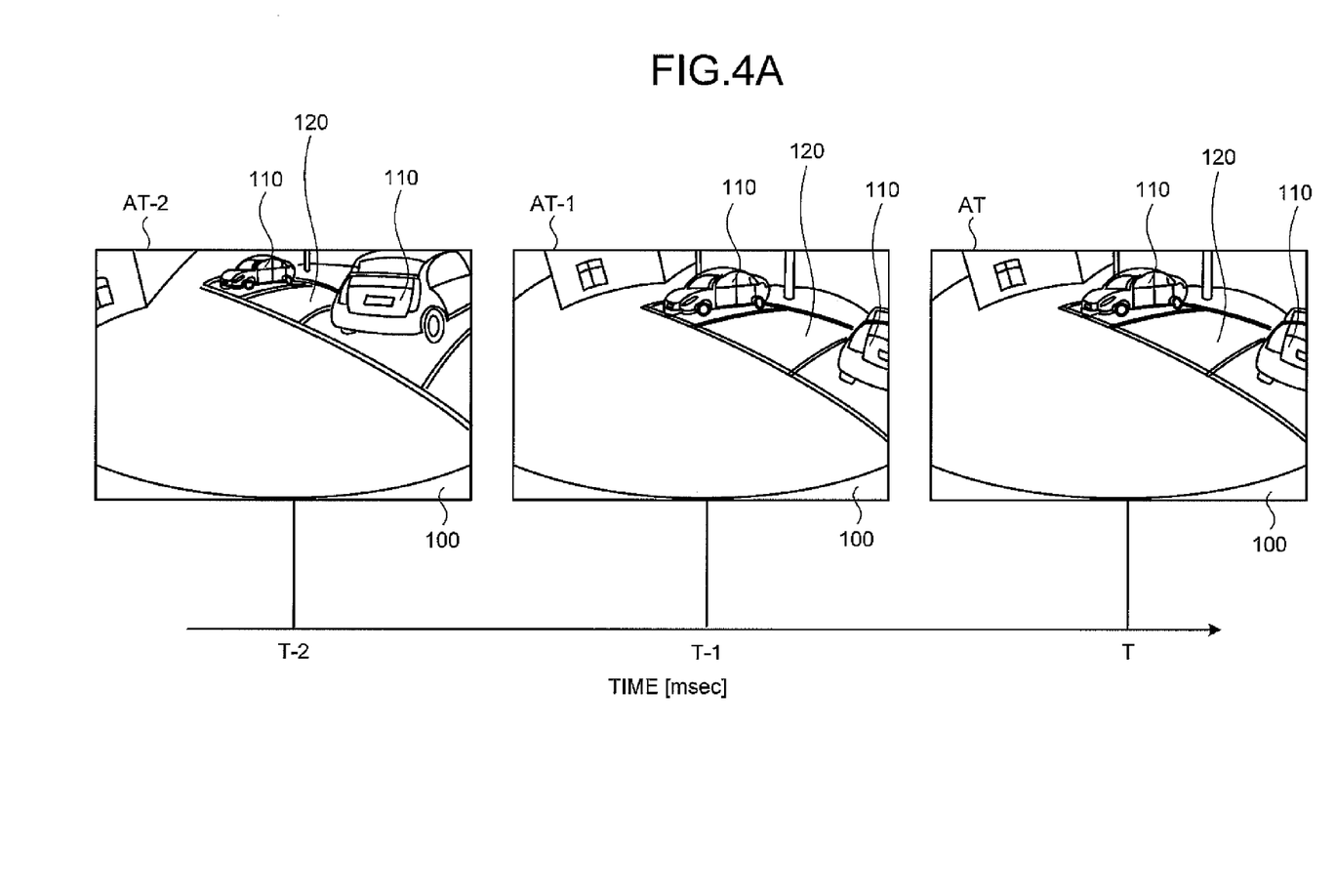
FIG. 4A is a diagram illustrating a camera image.

Herein, a content of an estimation process in the estimation unit 12c will be described in detail, with reference to FIG. 4A. FIG. 4A is a diagram illustrating camera images.

A time T-2 is a time when a driver switches a gear to reverse, that is, a time when the vehicle 100 starts backward running, while a period of time from the time T-2 to a time T-1 is during the backward running and a period of time from the time T-1 to a time T is during stopping of the vehicle 100. That is, contents of a camera image AT-2 at the time T-2 and a camera image AT-1 at the time T-1 are different whereas the camera image AT-1 at the time T-1 is identical to a camera image AT at the time T.

FIG. 4A indicates that the camera image AT is taken at the time T, the camera image AT-1 is taken at the time T-1 before the time T, and the camera image AT-2 is taken at the time T-2 before the time T-1.

First, a content of estimation at time of backward running by the estimation unit 12c will be described with reference to the camera image AT-1 and the camera image AT-2, and subsequently, a content of estimation at time of stopping will be described with reference to the camera image AT and the camera image AT-1.

First, a content of estimation at time of backward running will be described. First, the estimation unit 12c acquires the camera image AT-1 taken at the time T-1 from the camera 11 and acquires the camera image AT-2 taken at the time T-2 from the image data 13a stored in the storage unit 13.

Subsequently, the estimation unit 12c extracts an motion vector (optical flow) that connects identical feature points between camera images that are the camera image AT-1 and the camera image AT-2 continued in a time series, by, for example, a gradient method or a block matching method. Then, the estimation unit 12c detects a change or difference between the camera images based on the extracted optical flow.

Specifically, in a case where the camera image AT-1 in FIG. 4A is compared with the camera image AT-2, a surface area of the parking space 120 in the camera image AT-1 is greater than that of the parking space 120 in the camera image AT-2. That is, a change between the camera images is produced.

Herein, the estimation unit 12c detects a produced change or difference between camera images that are the camera image AT-1 and the camera image AT-2, based on, for example, the optical flow described above. Then, the estimation unit 12c estimates that the vehicle 100 is running in a case where the optical flow is extracted.

In a case where it is estimated that the vehicle 100 is running, the estimation unit 12c estimates a running state of the vehicle 100 such as a steering angle or a running speed, based on a difference produced by a change between the camera images, for example, the optical flow described above. Then, the estimation unit 12c outputs, to the rendering unit 12d, running estimation data that indicate that the vehicle 100 is running backward at, for example, a speed of 20 km/h (not illustrated), on a route to the parking space 120.

Next, a content of estimation of stopping by the estimation unit 12c will be described with reference to the camera image AT and the camera image AT-1. First, the estimation unit 12c acquires the camera image AT taken at the time T from the camera 11 and the camera image AT-1 taken at the time T-1 from the image data 13a stored in the storage unit 13, similarly to a process of estimation during running.

Subsequently, the estimation unit 12c compares the camera image AT with the camera image AT-1 and detects a difference produced by a change between the camera images. However, there is not a change between camera images in FIG. 4 that are the camera image AT and the camera image AT-1, and hence, for example, the optical flow described above is not extracted, that is, a difference produced by a change between the camera images is not detected.

Therefore, in a case where such a difference is not detected, the estimation unit 12c estimates that the vehicle 100 is stopped, and outputs, to the erasing unit 12e, stopping estimation data that indicate a result of estimation.

By returning to the descriptions for FIG. 3, the control unit 12 will be continued to be described. The rendering unit 12d renders the prediction lines 2 based on the running estimation data and a vehicle width of the vehicle 100.

Specifically, the rendering unit 12d renders the prediction lines 2 that indicate a predicted direction of travel of the vehicle 100, based on a running state of the vehicle 100, such as a steering angle or a running speed, acquired from the estimation unit 12c, for example, running estimation data that include data of the optical flow described above, and a vehicle width of the vehicle 100. The rendering unit 12d outputs, to the image synthesis unit 12b, data that indicate an image of the rendered prediction lines 2.

Based on a camera image taken at a current time acquired from the camera 11 and an image of the prediction lines 2 acquired from the rendering unit 12d, the image synthesis unit 12b synthesizes a superimposed image with the image of the prediction lines 2 superimposed on such a camera image. The image synthesis unit 12b outputs, to the display unit 14, data that indicate the synthesized superimposed image.

The display unit 14 is, for example, a liquid crystal display, and displays a superimposed image output from the image synthesis unit 12b. The display unit 14 is not limited to a liquid crystal display as long as it is possible for a driver to visually recognize a superimposed image.

The erasing unit 12e erases the prediction lines 2 based on stopping estimation data. Specifically, in a case where the vehicle 100 is stopped, the erasing unit 12e produces an image with the prediction lines 2 having been erased therein, based on stopping estimation data acquired from the estimation unit 12c. The erasing unit 12e outputs, to the image synthesis unit 12b, data that indicate an image with the prediction lines 2 having been erased therein.

Based on a camera image taken at a current time acquired from the camera 11 and an image with the prediction lines 2 having been erased therein acquired from the erasing unit 12e, the image synthesis unit 12b synthesizes a superimposed image with the image with the prediction lines 2 having been erased therein being superimposed on such a camera image.

That is, such a superimposed image is a superimposed image with the prediction lines 2 having been erased from a superimposed image that is synthesized immediately before stopping and includes the prediction lines 2. The image synthesis unit 12b outputs, to the display unit 14, data that indicate a superimposed image with the prediction lines 2 having been erased therein.

Therefore, for a driver, the driving support device 10 can display the prediction lines 2 in a superimposed image in a case where the vehicle 100 is running or display none of the prediction lines 2 in a superimposed image in a case where the vehicle 100 is stopped.

Figure 4B:
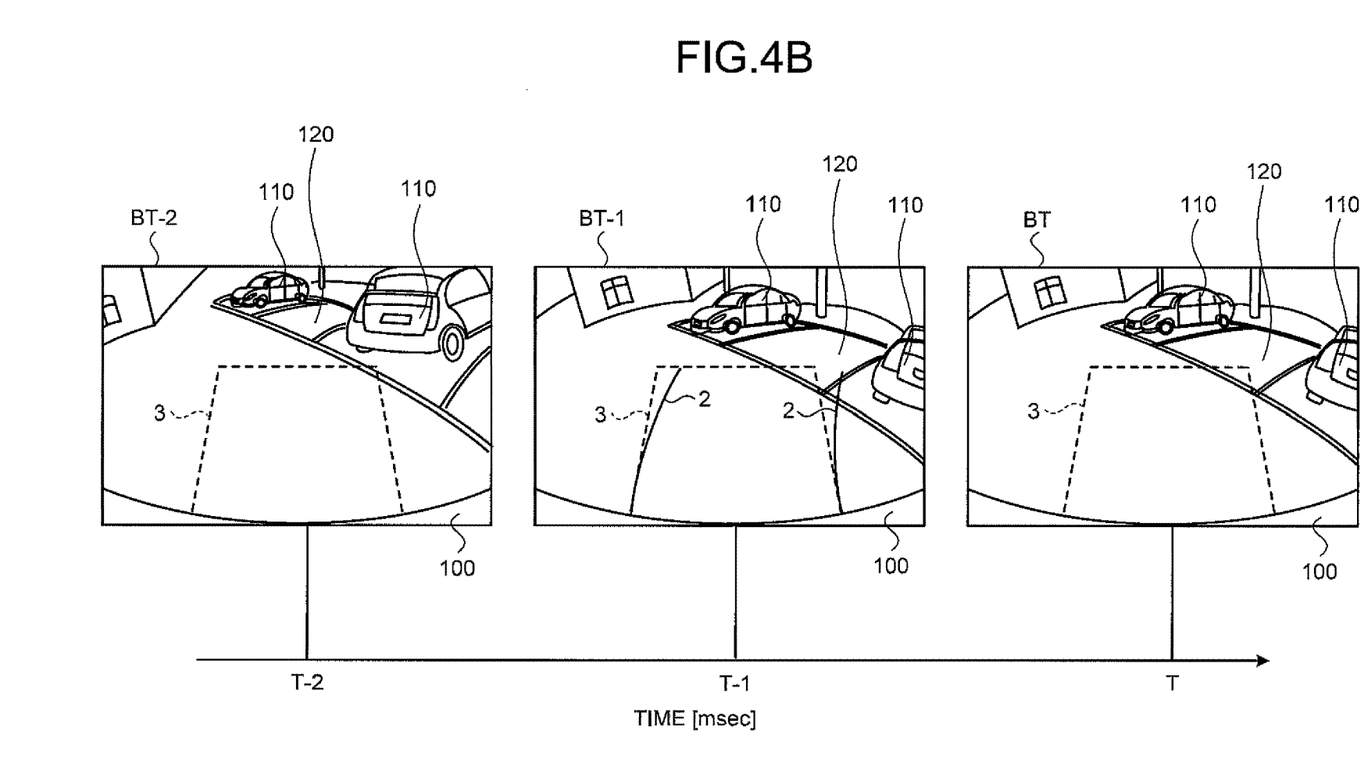
FIG. 4B is a diagram illustrating erasing of a prediction line.

Herein, contents of processing of the prediction lines 2 in the rendering unit 12d and the erasing unit 12e will be described in detail, with reference to FIG. 4B. FIG. 4B is a diagram illustrating erasing of the prediction lines 2. FIG. 4B is a diagram that corresponds to FIG. 4A, and a time T, a time T-1, and a Time T-2 in FIG. 43 correspond to the time T, the time T-1, and the time T-2 in FIG. 4A, respectively.

FIG. 4B illustrate a superimposed image BT that corresponds to the camera image AT, a superimposed image BT-1 that corresponds to the camera image AT-1, and a superimposed image BT-2 that corresponds to the camera image AT-2.

In the following, first, rendering of the prediction lines 2 by the rendering unit 12d will be described, and subsequently, erasing of the prediction lines 2 by the erasing unit 12e will be described.

The rendering unit 12d produces an image with the prediction lines 2 rendered therein, based on a difference between the camera image AT-1 and the camera image AT-2 illustrated in FIG. 4A. Then, the image synthesis unit 12b synthesizes the superimposed image BT-1 illustrated in FIG. 4B by using the camera image AT-1 and an image of the prediction lines 2.

Specifically, in a case where the vehicle 100 runs toward the parking space 120 with both sides interposed by the vehicles 110 from the time T-1 to the time T-2, the rendering unit 12d, first, calculates a difference based on the camera image AT-1 and the camera image AT-2, and thereby, acquires running estimation data that indicate traveling to the parking space 120.

The rendering unit 12d renders, based on such running estimation data, the prediction lines 2 toward the parking space 120, that is, the prediction lines 2 that are rightward relative to a direction of travel in a case where backward running of the vehicle 100 is executed in the direction of travel.

Therefore, due to the driving support device 10, a driver can drive according to the prediction lines 2 in a case where backward running is executed toward the parking space 120 interposed by the vehicles 110 illustrated in FIG. 4A, and thereby, execute smooth parking without feeling stress.

Next, erasing of the prediction line 2 will be described. In FIG. 4A and FIG. 4B, the erasing unit 12e acquires stopping estimation data that indicate that a change or difference between camera images that are the camera image AT and the camera image AT-1 is not produced in a case where the vehicle 100 is stopped at the time T-1.

Subsequently, the erasing unit 12e erases the prediction lines 2 superimposed and displayed in the superimposed image BT-1, based on the stopping estimation data. Specifically, the erasing unit 12e produces an image with the prediction lines 2 having been erased therein, for example, a plain image, based on the stopping estimation data. Then, the image produced by the erasing unit 12e is superimposed on the camera image AT, and thereby, the superimposed image BT with the prediction lines 2 being not displayed thereon is produced.

That is, the superimposed image BT is synthesized from the camera image AT that is substantially identical to the camera image AT-1, and hence, is a superimposed image with the prediction lines 2 having been erased from the superimposed image BT-1. Thereby, the driving support device 10 can prevent a driver from readily misunderstanding.

The superimposed image BT-2 is produced based on the time T-2 when the vehicle 100 starts backward running, and hence, an immediately preceding camera image does not exist. That is, the estimation unit 12c cannot compare between camera images, and hence, processing of the prediction lines 2 is not executed for the superimposed image BT-2, but a superimposed image with the vehicle width lines 3 superimposed on the camera image AT-2 is synthesized. Descriptions of the vehicle width lines 3 on the superimposed image BT and the superimposed image BT-1 will be omitted as described above.

A period of time from the time T-1 when the vehicle 100 is stopped to the time T when the estimation unit 12c estimates stopping is an image-taking interval of the camera 11, and is a so-called time lag. It is preferable to set an image-taking interval of the camera 11 in such a manner that such a time lag is a period of time that cannot be recognized by a driver.

Meanwhile, the driving support device 10 erases the prediction lines 2 after a waiting time for retaining a state of display of the prediction lines 2 has passed since the time T when the vehicle 100 is stopped.

That is, the erasing unit 12e sets a waiting time from estimation of stopping of the vehicle 100 by the estimation unit 12c to a start of erasing of the prediction lines 2. In the following, this matter will be described in detail by using FIG. 5.

Figure 5:
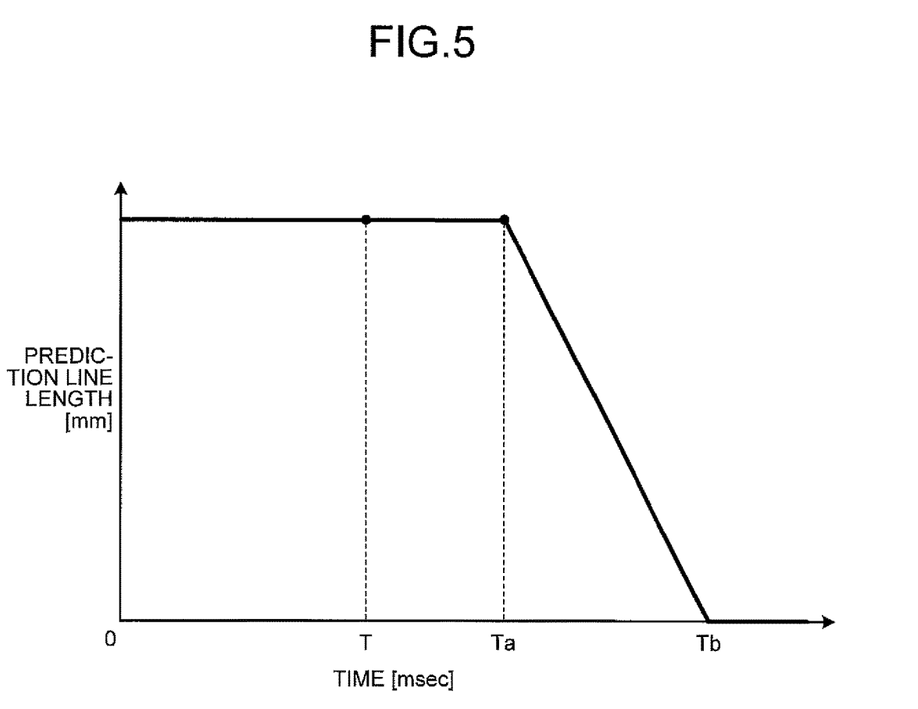
FIG. 5 is a diagram illustrating a relationship between lengths of prediction lines at a time of erasing of the prediction lines and time.

FIG. 5 is a diagram illustrating a relationship between lengths of the prediction lines 2 at a time of erasing of the prediction lines and time. A specific example of erasing of the prediction lines 2 will be described below, by using FIG. 6.

In a graph illustrated in FIG. 5, a horizontal axis indicates passage of time and a vertical axis indicates lengths of the prediction lines 2. In FIG. 5, lengths of the prediction lines 2 being "0" means that erasing of the prediction lines 2 is completed.

A time T in FIG. 5 corresponds to the time T in FIG. 4A and FIG. 4B, and is a time when the estimation unit 12c estimates that the vehicle 100 is stopped. A time Ta is a time when erasing of the prediction lines 2 is started (an erasing start time Ta, below) and a time Tb is a time when erasing of the prediction lines 2 is completed (an erasing completion time Tb, below).

As illustrated in FIG. 5, the driving support device 10 can continue to display the prediction lines 2 without erasing thereof, during a predetermined waiting time from the time T when it is estimated that the vehicle 100 is stopped.

Specifically, the erasing unit 12e erases the prediction lines 2 based on stopping estimation data acquired from the estimation unit 12c. Herein, the driving support device 10 provides a waiting time from the time T to the erasing start time Ta before erasing is started, and starts erasing of the prediction lines 2 after the waiting time has passed, that is, from the erasing start time Ta.

Thereby, the driving support device 10 continues to display the prediction lines 2, for example, even in a case where backward running and stopping for a short period of time are repeated, and thereby, can mitigate confusion of a driver. It is possible to set such a waiting time at an arbitrary period of time.

Figure 6:
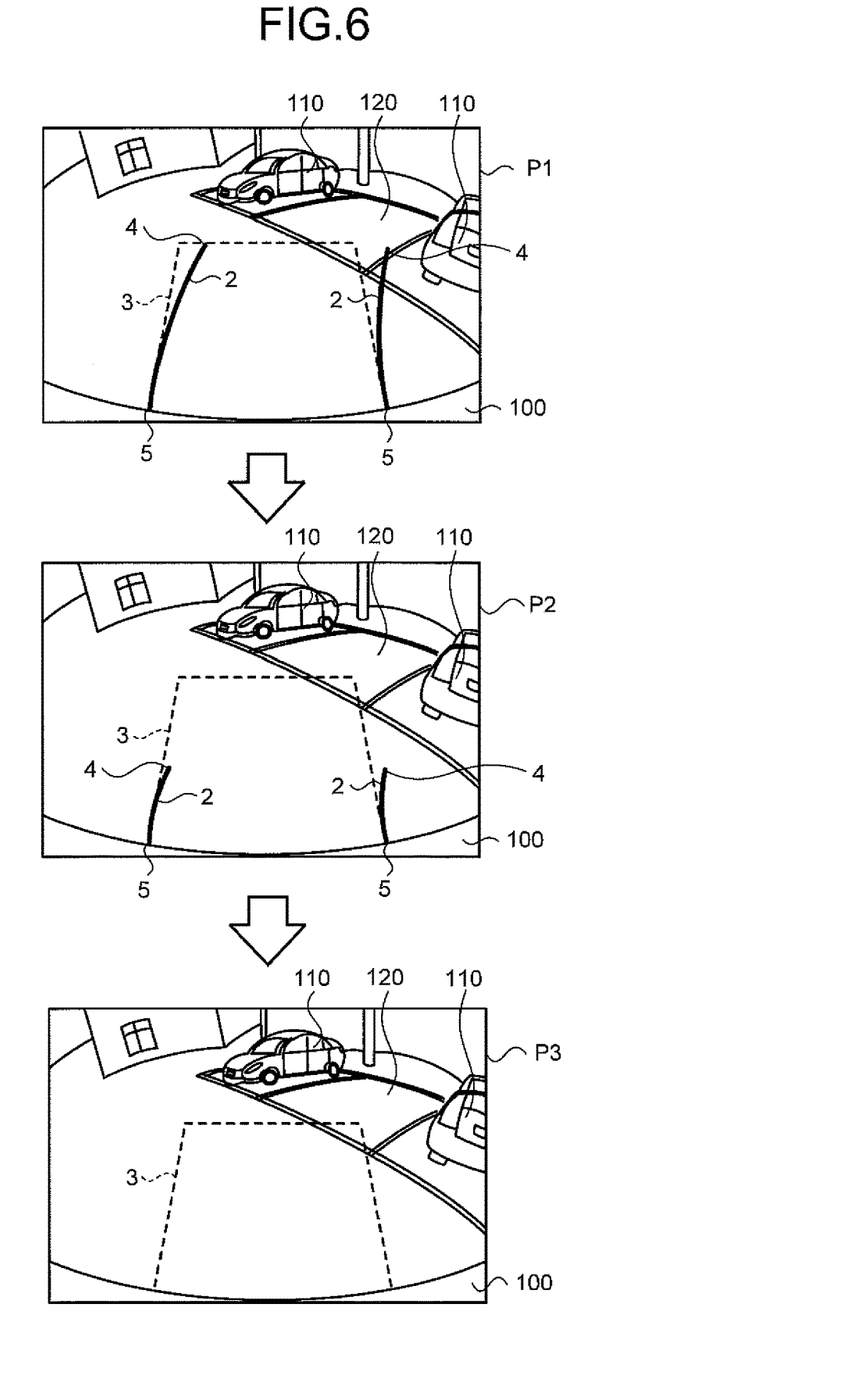
FIG. 6 is a diagram illustrating a specific example of erasing of prediction lines.

The driving support device 10 provides a duration time from a start of erasing of the prediction lines 2 to completion of erasing thereof. In the following, an erasing method with such a duration time provided therein will be described by using FIG. 5 and FIG. 6. FIG. 6 is a diagram illustrating a specific example of erasing of the prediction lines 2.

As illustrated in FIG. 5, the driving support device 10 provides a duration time from the erasing start time Ta to the erasing completion time Tb. Specifically, the erasing unit 12e starts erasing of the prediction lines 2 from the erasing start time Ta, gradually spends time, that is, spends a "duration time", and completes erasing of the prediction lines 2 at the erasing completion time Tb, based on a result of estimation acquired from the estimation unit 12c.

A duration time can be set at an arbitrary period of time, and may be set at, for example, a period of time adapted to a decrease of reliability of the prediction lines 2. Herein, reliability indicates a degree of accuracy of a correspondence between the displayed prediction lines 2 and an actual direction of travel of the vehicle 100.

Specifically, in a case where the vehicle 100 is stopped, a probability of changing a steering angle due to a driver's operation of a steering wheel is increased as a stopping time is increased, and a probability of an accurate correspondence between the displayed prediction lines 2 and an actual direction of travel of the vehicle 100 is decreased as time proceeds.

That is, a reliability for indicating that the displayed prediction lines 2 indicate an accurate direction is decreased for a driver as a period of time from stopping of the vehicle 100 is increased.

However, a driver cannot recognize such a decrease of reliability of the prediction lines 2 from an image displayed on the display unit 14, and hence, a probability of causing a driver to misunderstand is increased as the reliability is decreased.

Therefore, the driving support device 10 informs a driver of such a decrease of reliability of the prediction lines 2 so that misunderstanding can be prevented from being readily caused. Specifically, a duration time adapted to a decrease of reliability from a start of erasing of the prediction lines 2 is provided to complete the erasing, and thereby, a driver is informed of the decrease of reliability.

It is possible for driving support device 10 to execute setting as to how the prediction lines 2 are erased for a duration time. A specific example of such erasing of the prediction lines 2 will be described by using FIG. 6.

As illustrated in FIG. 6, a superimposed image P1 indicates a state at a time of a start of erasing of the prediction lines 2, a superimposed image P2 indicates a state in the middle of erasing of the prediction lines 2, and a superimposed image P3 indicates a state of completion of erasing of the prediction lines 2. The duration time described above is a period of time between the superimposed image P1 and the superimposed image P3.

As illustrated in FIG. 6, the erasing unit 12e starts erasing of the prediction lines 2 displayed in the superimposed image P1, based on stopping estimation data acquired from the estimation unit 12c.

Then, as illustrated in the superimposed image P2, erasing is executed by gradually decreasing lengths of the prediction lines 2 from the distal ends 4 of the prediction lines 2 away from the vehicle 100 in the superimposed image P2 to the proximal ends 5 near the vehicle 100 in the superimposed image P2.

Specifically, the erasing unit 12e produces a plurality of images with a decreased length of the prediction lines 2 and outputs such images to the image synthesis unit 12b in order of decreasing lengths of the prediction lines 2.

Sequentially, the image synthesis unit 12b synthesizes superimposed images with images of the prediction lines 2 acquired from the erasing unit 12e being sequentially superimposed on a camera image, for example, the superimposed image P2, and the display unit 14 continuously switches and displays such superimposed images. That is, the prediction lines 2 are erased while lengths of the prediction lines 2 are gradually decreased.

In an example of FIG. 6, for the purpose of illustration, the superimposed image P2 is illustrated as a representative example of an image with decreased lengths of the prediction lines 2 between the superimposed image P1 and the superimposed image P3, and such an image is not limited thereto.

In a case where the prediction lines 2 in FIG. 6 are erased, the superimposed image P3 may be displayed after the superimposed image P1 without displaying the superimposed image P2, that is, the erasing may be executed by instantaneous erasing.

In a case where the erasing is executed by decreasing lengths of the prediction lines 2, for example, a graph from the erasing start time Ta to the erasing completion time Tb is expressed as a formula of a straight line in FIG. 5, and is not limited thereto but may be expressed as, for example, a formula of a curved line such as a quadratic function.

Figure 7:
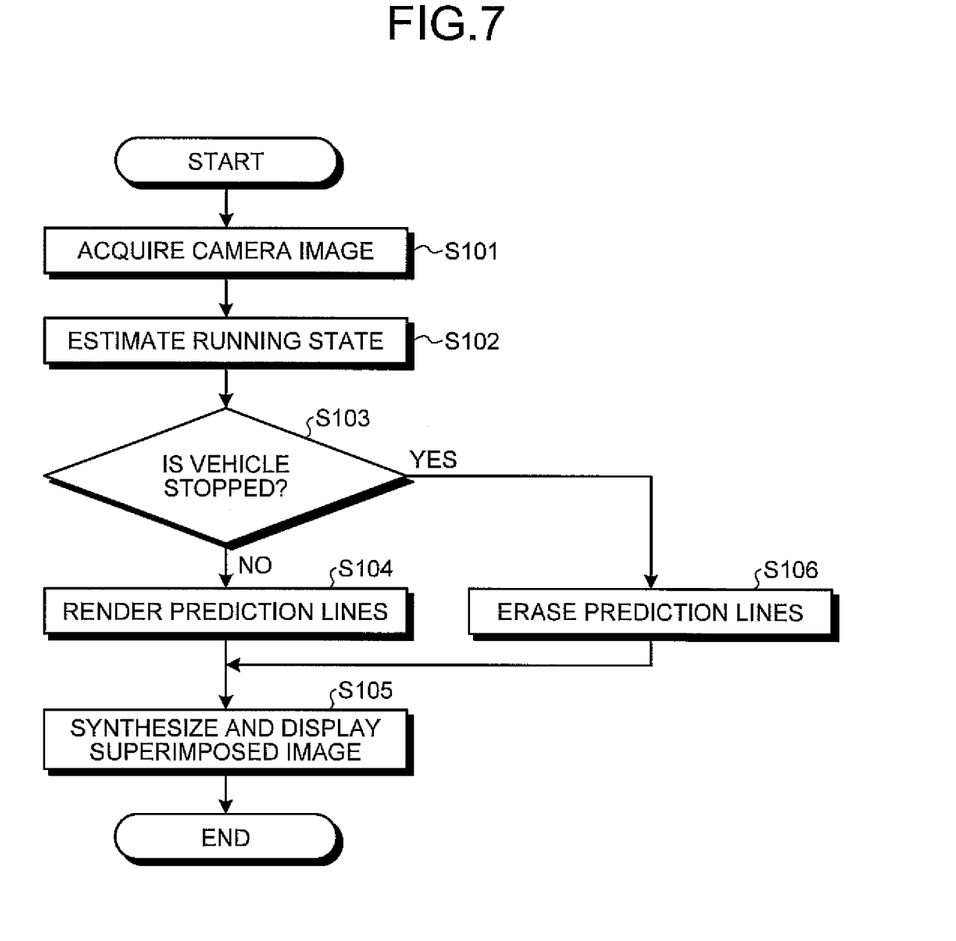
FIG. 7 is a flowchart illustrating steps of a process to be executed by a driving support device according to an embodiment.

Next, a specific operation of the driving support device 10 according to the embodiment will be described with reference to FIG. 7. FIG. 7 is a flowchart illustrating steps of a process for erasing prediction lines to be executed by the driving support device 10.

As illustrated in FIG. 7, the acquisition unit 12a acquires a camera image from the camera 11 mounted on the vehicle 100 (step S101). Subsequently, the estimation unit 12c estimates a running state of the vehicle 100 based on a plurality of camera images arranged in a time series (step S102).

Subsequently, the estimation unit 12c determines whether or not the vehicle 100 is stopped, based on a result of estimation in step S102 (step S103).

The rendering unit 12d renders the prediction line 2 in a case where determination is provided in such a manner that the vehicle 100 is not stopped (step S103, No), in other words, in a case where determination is provided in such a manner that the vehicle 100 is running (step S104).

Subsequently, the image synthesis unit 12b displays, on the display unit 14, a superimposed image synthesized by superimposing the prediction lines 2 rendered in step S104 on a current camera image (step S105).

On the other hand, in a case where determination is provided in such a manner that the vehicle 100 is stopped (step S103, Yes), the erasing unit 12e erases the prediction lines 2 rendered immediately before stopping (step S106).

Subsequently, the image synthesis unit 12b displays a superimposed image with the prediction lines 2 having been erased therein on the display unit 14 (step S105).

As described above, the driving support device 10 according to the embodiment includes the estimation unit 12c, the rendering unit 12d, and the erasing unit 12e. The estimation unit 12c estimates whether the vehicle 100 is running or stopped, based on the plurality of camera images arranged in a time series. In a case where the estimation unit 12c estimates that the vehicle 100 is running, the rendering unit 12d renders the prediction lines 2 that indicate a predicted direction of travel of the vehicle 100. In a case where the estimation unit 12c estimates that the vehicle 100 is stopped, the erasing unit 12e erases the prediction lines 2 rendered immediately before stopping. Therefore, due to the driving support device 10 according to the embodiment, a driver can be prevented from readily misunderstanding.

Next, variations of a method for erasing the prediction lines 2 in a case where the erasing unit 12e of the driving support device 10 provides a duration time from a start of erasing of the prediction lines 2 to complete the erasing will be described with reference to FIG. 8 to FIG. 10.

Figure 8:
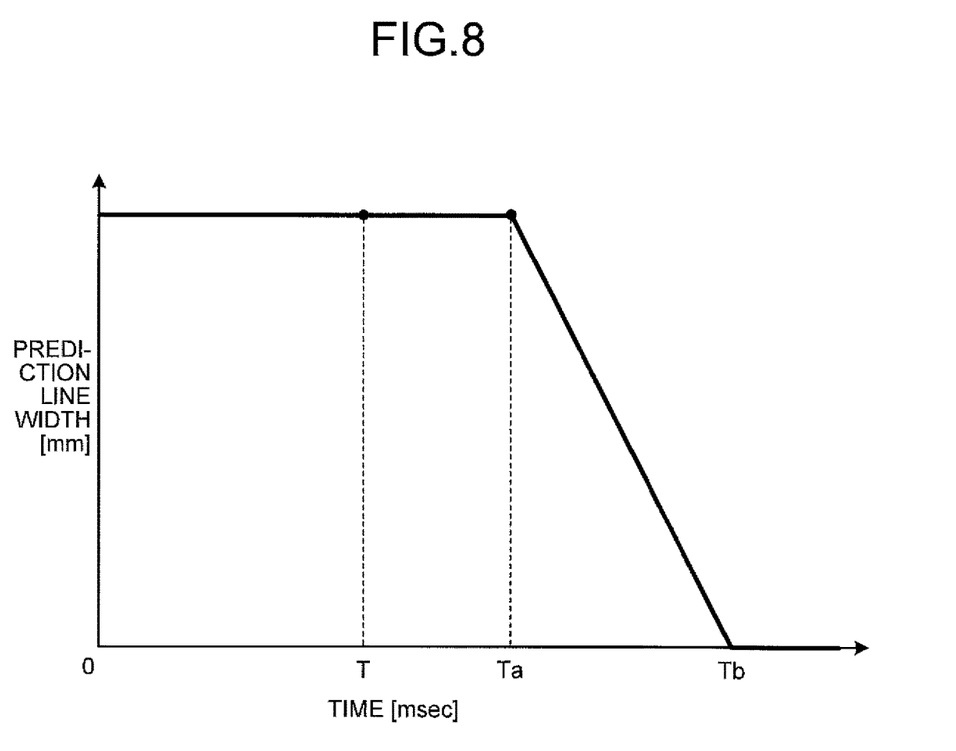
FIG. 8 is a diagram (part 1) illustrating a variation of erasing of prediction lines.
Figure 9:
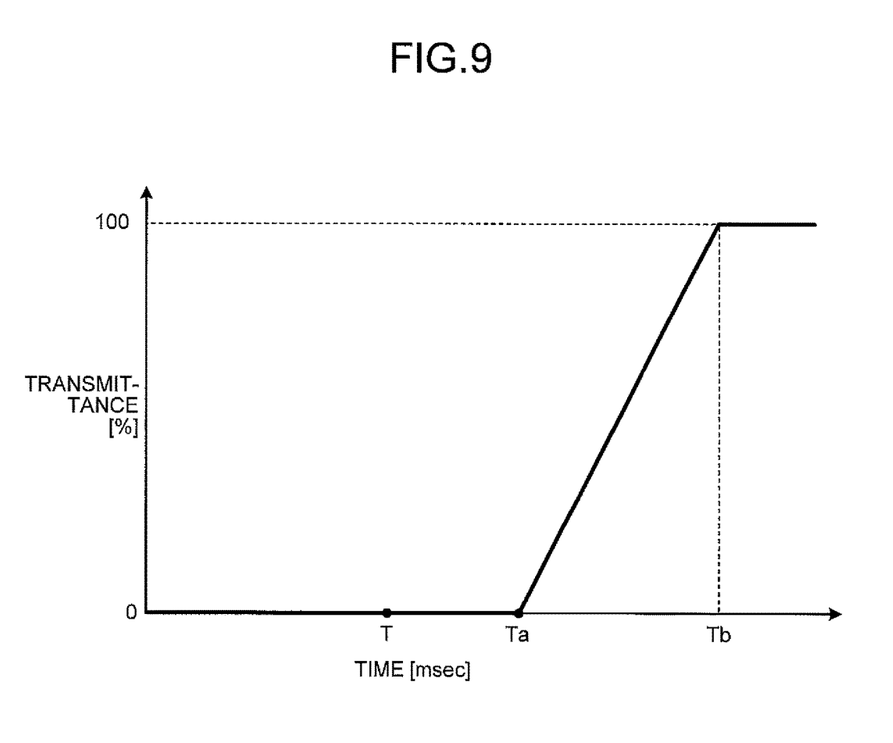
FIG. 9 is a diagram (part 2) illustrating a variation of erasing of prediction lines.
Figure 10:
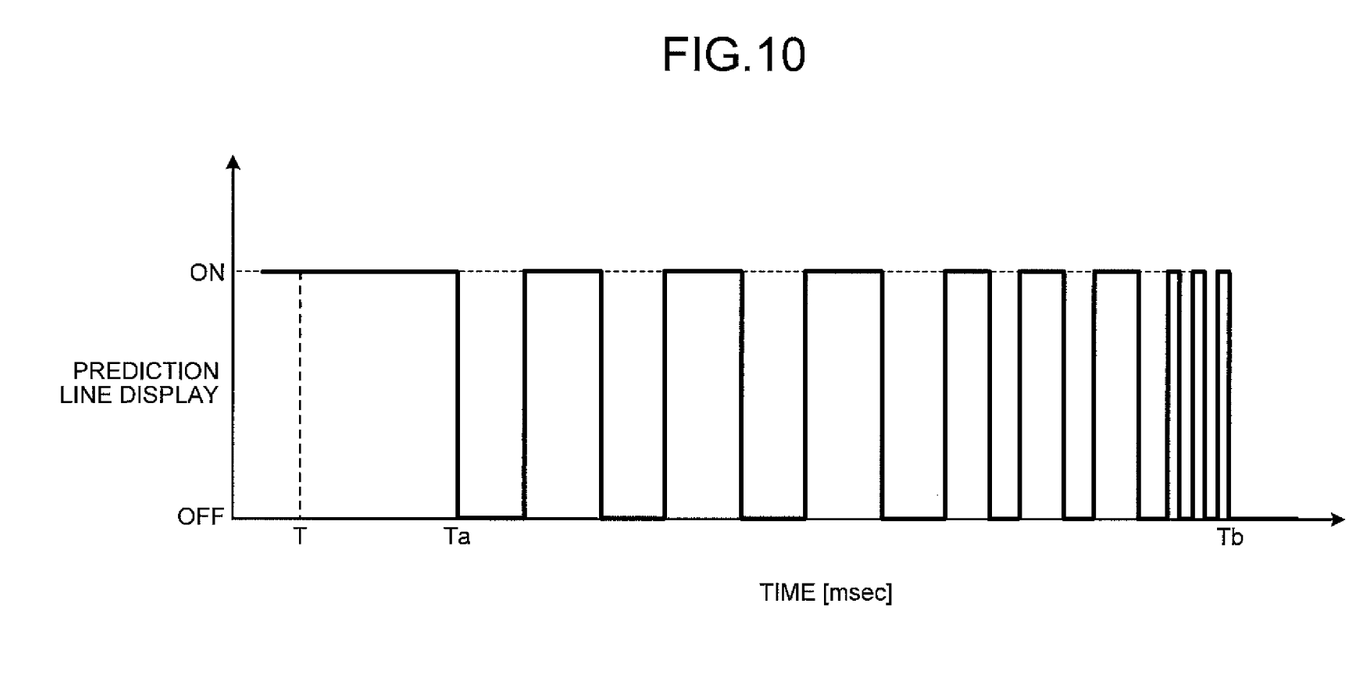
FIG. 10 is a diagram (part 3) illustrating a variation of erasing of prediction lines.

A time T, an erasing start time Ta, and an erasing completion time Tb in FIG. 8 to FIG. 10 correspond to the time T, the erasing start time Ta, and the erasing completion time TB in FIG. 5, respectively. Descriptions overlapping with those of FIG. 5 will be simplified or omitted.

FIG. 8 is a graph with a vertical axis that indicates widths of the prediction lines 2. In a variation illustrated in FIG. 8, the erasing unit 12e decreases widths of the prediction lines 2, that is, gradually thins the prediction lines 2 to erase the prediction lines 2 for a duration time from the erasing start time Ta to the erasing completion time Tb.

FIG. 9 indicates a graph with a vertical axis that indicates transmittances of the prediction lines 2. Herein, a state with a transmittance of "0%" indicates a state where the prediction lines 2 can be visually recognized while portions of a camera image being superimposed on the prediction lines 2 cannot be visually recognized. In a case where the transmittance is greater than 0% and less than 100%, for example, a state of "50%" indicates a state where both the prediction lines 2 that are semitransparent and portions of a camera image being superimposed on the prediction lines 2 can be visually recognized. For example, as the transmittance is increased, a camera image can be visually recognized more clearly than the prediction lines 2, and on the other hand, as the transmittance is decreased, the prediction lines 2 can be visually recognized more clearly than a camera image. A state with a transmittance of "100%" indicates a state where the prediction lines 2 are at a transparent state and hence cannot be visually recognized while portions of a camera image being superimposed on the prediction lines 2 can be visually recognized.

In an example illustrated in FIG. 9, transmittances of the prediction lines 2 are "0%", that is, the prediction lines 2 are displayed, from the time T when it is estimated that the vehicle 100 is stopped to the erasing start time Ta for the prediction lines 2.

Subsequently, the transmittances of the prediction lines are gradually increased, that is, the prediction lines 2 gradually become transparent, for a duration time from the erasing start time Ta to the erasing completion time Tb, so that portions of a camera image being superimposed on the prediction lines 2 can become visually recognized clearly. Then, at the erasing completion time Tb, the transmittances of the prediction lines are "100%", that is, the erasing unit 12e completes erasing of the prediction lines 2.

For a variation of erasing of the prediction lines 2, the erasing unit 12e may erase the prediction lines 2 after blinking thereof at a predetermined period. In the following, blinking and easing of the prediction lines 2 will be described by using FIG. 10.

FIG. 10 is a graph illustrating a state of display of the prediction lines 2. In a case where the prediction lines 2 are turned "ON", the state is such that the prediction lines 2 are displayed, or in a case of "OFF", the state is non-display, that is, such that the prediction lines 2 have been erased.

The erasing unit 12e alternately switches between "ON" and "OFF" of the prediction lines 2 from the erasing start time Ta, and thereby, for a driver, the prediction lines 2 appear to blink immediately before erasing thereof.

The erasing unit 12e decreases a switching interval between "ON" and "OFF", and thereby, a blinking period appears to decrease as approaching the erasing completion time Tb. As described above, display of the prediction lines 2 can be switched between "ON" and "OFF" to be blinked, and subsequently, to be erased.

The variations of a method for erasing the prediction lines 2 described above may be combined. For example, the erasing methods illustrated in FIG. 5 and FIG. 10 may be combined in such a manner that the erasing unit 12e gradually decreases lengths of the prediction lines 2 and blinks the prediction lines 2 to be erased.

Therefore, due to the variations of an erasing method described above, it goes without saying that the driving support device 10 according to the embodiment can obtain an effect similar to an effect of the erasing method that decreases lengths of the prediction lines 2 illustrated in FIG. 5.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A driving support device, comprising:
a storage storing therein images sequentially taken on a movable body; and
a processor operatively coupled to the storage, the processor being programmed to:
acquire an image at a current time taken on the movable body;
acquire an image taken immediately before the current time from the storage;
compare the acquired images to detect a difference produced by a change between the image taken at the current time and the image taken immediately before the current time;
estimate a running state of the movable body based on the difference;
predict a direction of travel of the movable body based on the difference;
determine whether the movable body is stopped based on the running state;
each time a difference between a latest two of the images is detected, produce a prediction line that indicates a trajectory in the predicted direction of travel of the movable body, and superimpose and render the prediction line on the image taken at the current time; and
when the difference between the latest two images is not detected, gradually increase transmittance of a prediction line produced immediately before the movable body is stopped in accordance with passage of time from when the movable body is stopped.

2. The driving support device according to claim 1, wherein the processor is programmed to completely erase the prediction line after a lapse of a predetermined duration of time from a start of the increasing of the transmittance.

3. The driving support device according to claim 2, wherein the processor is programmed to start increasing the transmittance of the prediction line after a lapse of a predetermined waiting time from when the movable body is stopped.

4. The driving support device according to claim 1, wherein the processor is programmed to start increasing the transmittance of the prediction line after a lapse of a predetermined waiting time from when the movable body is stopped.

5. The driving support device according to claim 1, wherein:
each time the difference between the latest two of the images is detected, the processor is also programmed to (i) produce movable-body width lines that indicate a width of the movable body according to an orientation of the movable body at the current time and (ii) display the movable-body width lines and the prediction line adjacent to each other along the predicted direction of travel of the movable body; and
when the difference between the latest two images is not detected, the processor is programmed to gradually increase the transmittance of the prediction line while continuing to render the movable-body width lines.

6. A driving support method, comprising:
acquiring an image at a current time taken on a movable body;
acquiring an image taken immediately before the current time from a storage storing therein images taken on the movable body;
comparing the acquired images to detect a difference produced by a change between the image taken at the current time and the image taken immediately before the current time;
estimating a running state of the movable body based on the difference;
predicting a direction of travel of the movable body based on the difference;
determining whether the movable body is stopped based on the running state;
each time a difference between a latest two of the images is detected, producing a prediction line that indicates a trajectory in the predicted direction of travel of the movable body;
superimposing and rendering the prediction line on the image taken at the current time; and
when the difference between the latest two images is not detected, gradually increasing transmittance of a prediction line produced immediately before the movable body is stopped in accordance with passage of time from when the movable body is stopped.

7. The driving support method according to claim 6, further comprising:
each time the difference between the latest two of the images is detected, (i) producing movable-body width lines that indicate a width of the movable body according to an orientation of the movable body at the current time and (ii) displaying the movable-body width lines and the prediction line adjacent to each other along the predicted direction of travel of the movable body; and
when the difference between the latest two images is not detected, gradually increasing the transmittance of the prediction line while continuing to render the movable-body width lines.

* * * * *